(12) United States Patent
Stephens

(10) Patent No.: US 10,408,463 B2
(45) Date of Patent: Sep. 10, 2019

(54) OVEN WITH STEAM WATER SEPARATION

(71) Applicant: ILLINOIS TOOL WORKS INC., Glenview, IL (US)

(72) Inventor: Jason M. Stephens, Bonney Lake, WA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 152 days.

(21) Appl. No.: 15/305,256

(22) PCT Filed: Apr. 20, 2015

(86) PCT No.: PCT/US2015/026622
§ 371 (c)(1),
(2) Date: Oct. 19, 2016

(87) PCT Pub. No.: WO2015/164239
PCT Pub. Date: Oct. 29, 2015

(65) Prior Publication Data
US 2017/0038079 A1    Feb. 9, 2017

Related U.S. Application Data

(60) Provisional application No. 62/028,631, filed on Jul. 24, 2015, provisional application No. 61/982,698, filed on Apr. 22, 2014.

(51) Int. Cl.
| | |
|---|---|
| *A47J 27/00* | (2006.01) |
| *F24C 15/00* | (2006.01) |
| *A47J 27/16* | (2006.01) |
| *A47J 27/04* | (2006.01) |
| *A21B 3/04* | (2006.01) |
| *F24C 14/00* | (2006.01) |
| *F24C 15/34* | (2006.01) |

(52) U.S. Cl.
CPC .............. *F24C 15/003* (2013.01); *A21B 3/04* (2013.01); *A47J 27/04* (2013.01); *A47J 27/16* (2013.01); *F24C 14/005* (2013.01); *F24C 15/34* (2013.01)

(58) Field of Classification Search
CPC ... A21B 3/04; A47J 27/04; A47J 27/16; F24C 15/327
USPC .......... 99/476, 477, 446, 444; 219/401, 400, 219/682; 126/20, 21 A
See application file for complete search history.

(56) References Cited

U.S. PATENT DOCUMENTS

| | | |
|---|---|---|
| 3,831,580 A | 8/1974 | McLean |
| 4,113,617 A | 9/1978 | Bereskin et al. |
| (Continued) | | |

FOREIGN PATENT DOCUMENTS

| | | |
|---|---|---|
| CH | 691280 | 6/2001 |
| CN | 1593303 | 3/2005 |
| (Continued) | | |

OTHER PUBLICATIONS

PCT, International Search Report and Written Opinion, International Application No. PCT/US2015/026622; dated Jun. 29, 2015, 12 pages.

*Primary Examiner* — Reginald Alexander
(74) *Attorney, Agent, or Firm* — Thompson Hine LLP

(57) ABSTRACT

An oven includes chamber with a food drippings drain path along which food drippings can flow for removal from the chamber. A steam input arrangement associated with the chamber includes a separate exit flow path for excess water.

16 Claims, 12 Drawing Sheets

(56) References Cited

U.S. PATENT DOCUMENTS

| | | | |
|---|---|---|---|
| 4,646,630 A * | 3/1987 | McCoy | A21C 13/00 |
| | | | 126/348 |
| 4,924,072 A * | 5/1990 | Oslin | A47J 27/04 |
| | | | 219/400 |
| 5,394,791 A | 3/1995 | Vallee | |
| 5,447,145 A | 9/1995 | Cappello et al. | |
| 5,549,038 A * | 8/1996 | Kolvites | A47J 27/16 |
| | | | 126/20 |
| 5,552,578 A * | 9/1996 | Violi | A21B 3/04 |
| | | | 126/20 |
| 5,601,013 A | 2/1997 | Larsson | |
| 5,653,164 A | 8/1997 | Vallee | |
| 5,694,835 A * | 12/1997 | Mangina | A21B 3/04 |
| | | | 126/21 A |
| 5,869,812 A | 2/1999 | Creamer et al. | |
| 6,213,002 B1 * | 4/2001 | Batten | B01D 17/0208 |
| | | | 99/340 |
| 6,435,078 B1 | 8/2002 | Batten et al. | |
| 6,516,712 B1 | 2/2003 | Ratermann et al. | |
| 6,582,205 B2 | 6/2003 | Batten et al. | |
| 6,966,582 B1 | 11/2005 | Malone et al. | |
| 8,193,470 B1 | 6/2012 | Harlamert et al. | |
| 2002/0170864 A1 | 11/2002 | Batten et al. | |
| 2003/0145847 A1 | 8/2003 | Deuringer et al. | |
| 2005/0076900 A1 | 4/2005 | Walther et al. | |
| 2005/0235980 A1 * | 10/2005 | Hansen | A21B 3/00 |
| | | | 126/19 R |
| 2006/0001273 A1 | 1/2006 | Smith et al. | |
| 2007/0262590 A1 | 11/2007 | Courter et al. | |
| 2008/0149553 A1 | 6/2008 | Sowerby et al. | |
| 2008/0223357 A1 | 9/2008 | Bartelick et al. | |
| 2008/0276925 A1 | 11/2008 | Griswold et al. | |
| 2009/0178576 A1 | 7/2009 | Valentine et al. | |
| 2012/0085244 A1 * | 4/2012 | Giazzon | F24C 15/327 |
| | | | 99/330 |
| 2012/0111849 A1 | 5/2012 | Henry et al. | |
| 2013/0133638 A1 | 5/2013 | Kulakowski et al. | |
| 2013/0234578 A1 | 9/2013 | Ala et al. | |
| 2013/0318880 A1 | 12/2013 | Edwards et al. | |
| 2013/0319393 A1 | 12/2013 | Harward et al. | |
| 2014/0290500 A1 | 10/2014 | Wurdinger et al. | |
| 2014/0311360 A1 | 10/2014 | Bartelick et al. | |
| 2014/0319119 A1 * | 10/2014 | Raghavan | H05B 1/0263 |
| | | | 219/396 |

FOREIGN PATENT DOCUMENTS

| | | |
|---|---|---|
| CN | 1729374 | 2/2006 |
| DE | 19843842 | 3/2000 |
| DE | 202004000106 | 6/2004 |
| DE | 202009006424 | 8/2009 |
| DE | 102008025294 | 10/2009 |
| DE | 102012221857 | 5/2013 |
| EP | 0712578 | 5/1996 |
| EP | 1102010 | 5/2001 |
| EP | 1148764 | 10/2001 |
| EP | 1384406 | 1/2004 |
| EP | 1517092 | 3/2005 |
| EP | 1914479 | 4/2008 |
| EP | 2703729 | 3/2014 |
| GB | 2163845 | 3/1986 |
| KR | 20130027863 | 3/2013 |
| WO | WO 9117661 | 11/1991 |
| WO | WO2004094912 | 11/2004 |
| WO | WO 2002/068876 | 9/2005 |
| WO | WO 2011/128103 | 10/2011 |

\* cited by examiner

OVEN WITH STEAM WATER SEPARATION

TECHNICAL FIELD

This application relates generally to ovens and, more specifically, to an oven with a steam input arrangement in which excess water to the steam input arrangement is inhibited from mixing with draining oven grease flows during cooking.

BACKGROUND

In ovens that include steam production, water consumption is an issue. In some ovens (e.g., baking ovens) it is common to cook without steam for a period of time and then deliver steam into the cooking chamber at a specified time during the cooking process to achieve desired food product quality. Often times a thermal mass is used to create steam by directing water onto the thermal mass. The impingement of the water onto the hot thermal mass causes nearly instantaneous conversion of the water to steam, which then fills the oven cooking chamber. U.S. Pat. No. 6,516,712 discloses one embodiment of an oven of this type. However, as general rule not all of the water is converted to steam.

Ovens including steaming can create issues for handling of excess water from the steam input arrangement, particularly in ovens that also tend to be used for cooking foods that produce drippings that also need to be handled.

It would be desirable to provide an oven that is effective at limiting excess water mixing with food drippings.

SUMMARY

An oven includes chamber with a food drippings drain path along which food drippings can flow for removal from the chamber. A steam input arrangement within the chamber includes a separate exit flow path for excess water.

In one aspect, an oven includes an oven chamber, and an outlet from the oven chamber leading to a chamber drain flow path for delivering food drippings out of the oven chamber. A steam input arrangement is associated with the oven chamber and includes a heat accumulator arrangement to which water is delivered to generate steam. A water collecting structure is positioned to capture excess water that passes through the heat accumulator arrangement without being converted to steam and to deliver the excess water to a water exit path from the oven chamber without the excess water mixing with drippings traveling along the chamber drain flow path.

In another aspect, an oven includes an oven chamber, and a chamber floor outlet leading to a chamber drain flow path for delivering food drippings out of the oven chamber. A steam input arrangement within the oven chamber includes a heat accumulator arrangement to which water is delivered to generate steam. A water collecting structure is positioned to capture excess water that passes through the heat accumulator arrangement without being converted to steam and to deliver the excess water to a water exit path from the oven chamber without the excess water mixing with drippings traveling along the chamber drain flow path, wherein the water exit path delivers water to a water collecting compartment external of the oven chamber.

In a further aspect, a method is provided for operating an oven that includes a chamber with a food drippings outlet and a steam input arrangement that includes an associated heat accumulator arrangement. The method involves, during a cooking cycle: directing food drippings to the food drippings outlet for removal from the chamber; delivering water onto the heat accumulator arrangement to convert the water to steam; capturing excess water that passes through the heat accumulator arrangement without being converted to steam; and directing the excess water to a separate outlet from the chamber so that the excess water exits the chamber without mixing with food drippings that enter the food drippings outlet.

The details of one or more embodiments are set forth in the accompanying drawings and the description below. Other features, objects, and advantages will be apparent from the description and drawings, and from the claims.

DETAILED DESCRIPTION

Figure 1:
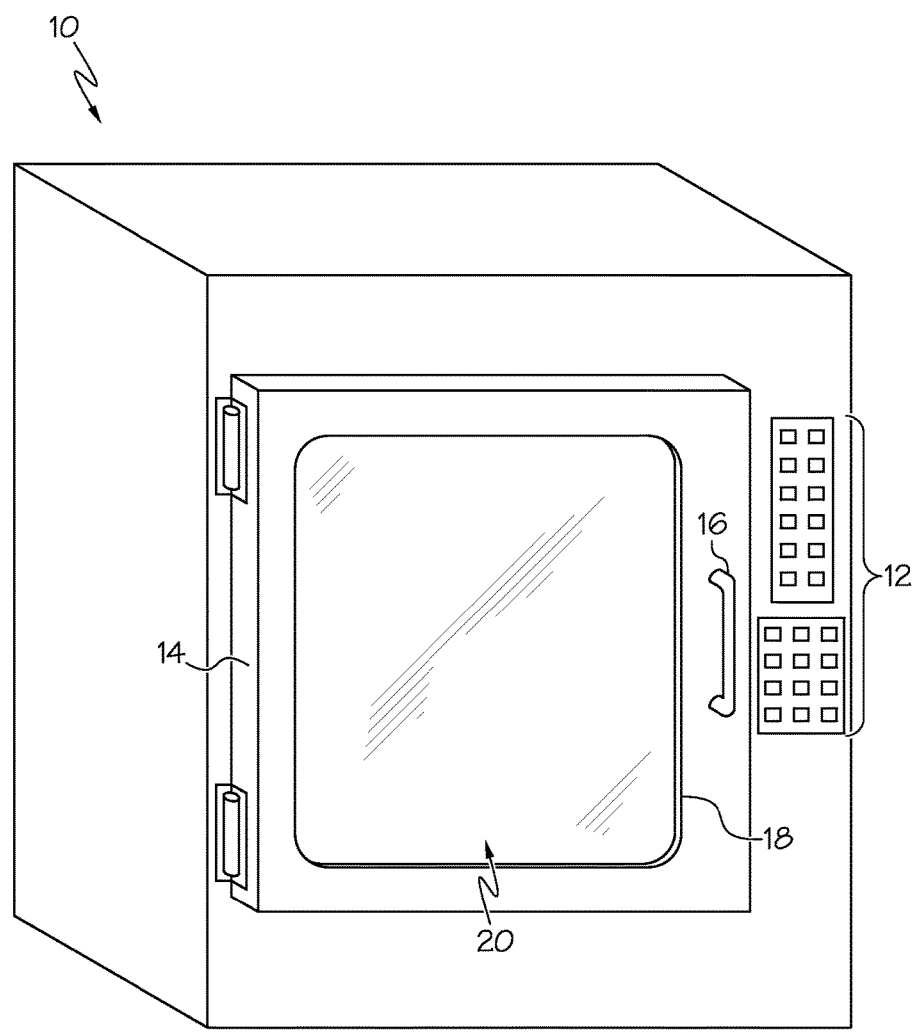
FIG. 1 is a perspective view of an oven.

Referring to FIG. 1, an exemplary oven 10 is shown. The oven 10 includes a control interface 12, which may include a variety of components, such as an information display area, a numeric keypad, ON/OFF buttons/keys, function specific buttons/keys, and/or various indicator lights. The oven 10 includes a hinged access door 14 with a handle 16 and glass area 18 for viewing the internal cooking chamber 20. In one embodiment, the door 14 may be vertically hinged so that the door 14 pivots horizontally. The door 14 is generally movable between a closed position and one or more open positions relative to an access opening to the internal cooking chamber 20. In one example, the oven 10 is a type that includes a heating source (e.g., electrical or gas-powered), a blower for moving air past the heating source, and a steam generation system. In one embodiment, stationary, removable racks may be located in the cooking chamber 20, while in another embodiment a movable food supporting structure (e.g., a rack or rotisserie rotation mechanism) may be located within the cooking chamber 20.

Figure 2:
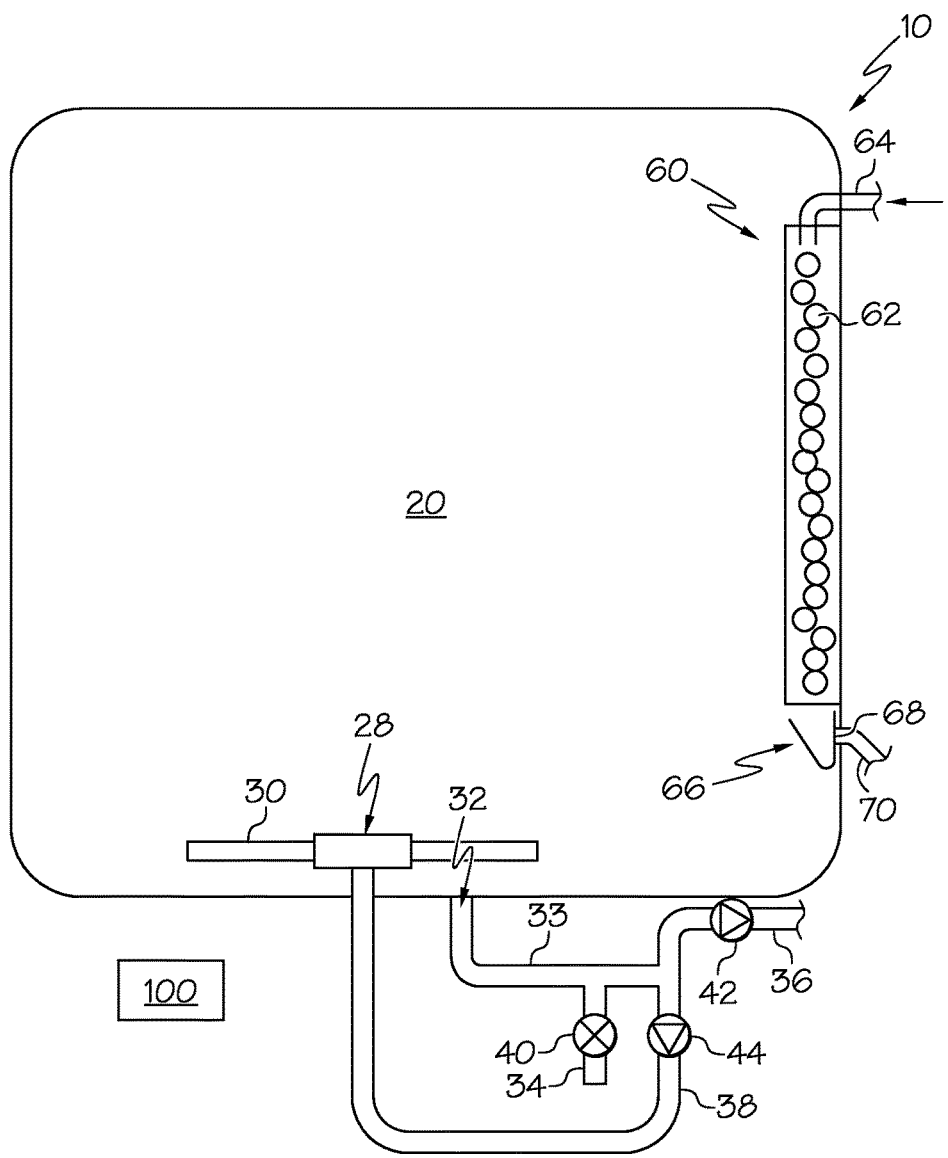
FIG. 2 is a schematic depiction of an oven and associated drain and cleaning flow arrangement and steam input arrangement.

As shown in the schematic of FIG. 2, the oven 10 also includes an internal spraying system 28 for cleaning purposes. In one embodiment, the spraying system 28 is formed by a rotatable spray arm 30 with multiple nozzles thereon, located at the bottom of the cooking chamber 20. However, stationary spray systems 28 could also be used, and the location of the spray system can be varied. As shown in FIG. 2, the bottom of the cooking chamber 20 is configured to direct liquid flows toward a drain 32 which may have a cover screen. In this regard, liquids in the oven 10 will tend to move under gravity toward the drain 32, including liquids from the spray cleaning system (spraying system 28), liquids from any steam that condenses within the oven 10, and food drippings generated directly by cooking foods (e.g., water, oils and grease that come out or off of heated food products). Thus, drain outlet 32 acts as a universal drain for all such liquid flows. The universal drain outlet 32 can deliver such flows along a common flow path 33 (referred to herein, in the alternative, as the chamber drain flow path) and then to any of a grease drain path 34 (e.g., that leads to a grease collecting compartment or container), a water drain path 36 (e.g., that leads to a municipal drain system or septic), or a water recirculation path 38 (e.g., leading back to the spray nozzles within the cooking chamber 20). A valve 40 controls flow along the grease drain path 34, a drain pump 42 controls flow along water drain path 36, and a wash pump 44 controls flow along water recirculation path 38. As an alternative to drain pump 42, a water drain valve may be used to selectively enable gravity flow along path 36 to drain. The oven 10 may also include a controller 100 configured to control the valve 40, the drain pump 42, the wash pump 44, or combinations thereof in order to accomplish desired oven functions and operations. By way of example, the controller 100 may be processor-based, solid state based or a combination of the two.

The oven cooking chamber 20 also includes a steam input arrangement 60, which includes a heat accumulator arrangement 62 formed by a mass of metal 62, and onto which water is delivered by a water input path 64 in order to generate. By way of example, the metal mass of the heat accumulator arrangement may be similar to that described in U.S. Pat. No. 6,516,712, but variations are possible. Any incoming water that is not converted to steam passes to the bottom of the arrangement 60 and must be delivered out of the cooking chamber 20.

Figure 3:
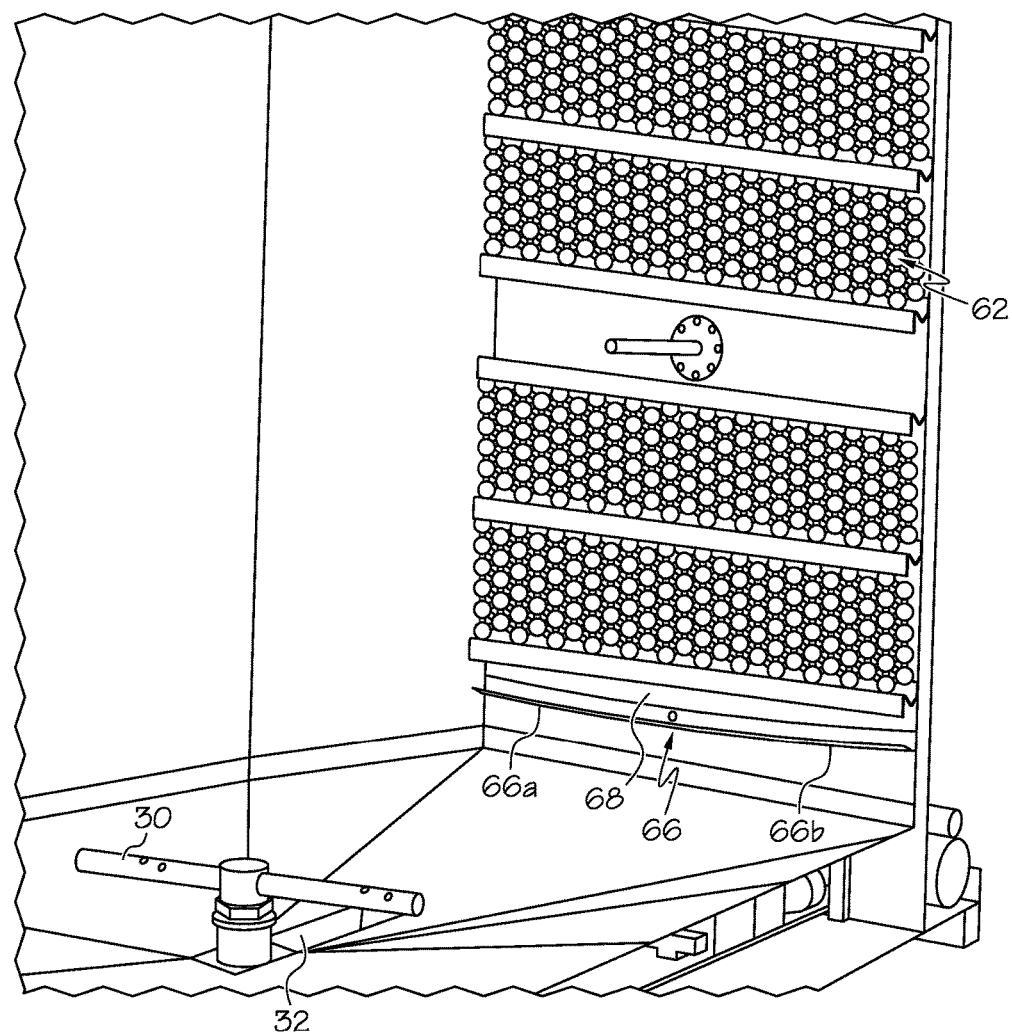
FIGS. 3-5 are partial perspective views of various aspects of the steam input arrangement and drain system.

As shown in FIGS. 2 and 3, rather than allowing such excess water to travel to the universal drain 32, the water is collected in a trough 66 or other water collecting structure at the bottom of the heat accumulator arrangement 60 and directed through an opening 68 in the chamber side wall. Notably, the opening 68 is raised above the floor of the cooking chamber. The trough 66 may take a variety of configurations and be mounted to the chamber side wall. In the illustrated embodiment, the water exit opening 68 of the chamber side wall is located substantially centrally along a length of the trough 66, and the trough includes sides 66a and 66b that angle in opposite directions downward toward the opening. The trough 66 therefore captures excess water that passes downward through the heat accumulator arrangement 62 without being converted to steam and delivers the excess water to side wall opening 68 which leads to a water exit path 70 from the chamber 20 without the excess water mixing with drippings traveling along the chamber drain flow path 33. However, it is recognized that other configurations are possible, such as a trough that includes a single incline or angle from one end to the other, with the side wall opening located at the lower end of the trough. In another alternative, the trough could flow water to multiple spaced apart chamber side wall openings, or could lead to a conduit that extends downward from the trough and through the chamber floor.

Figure 4:
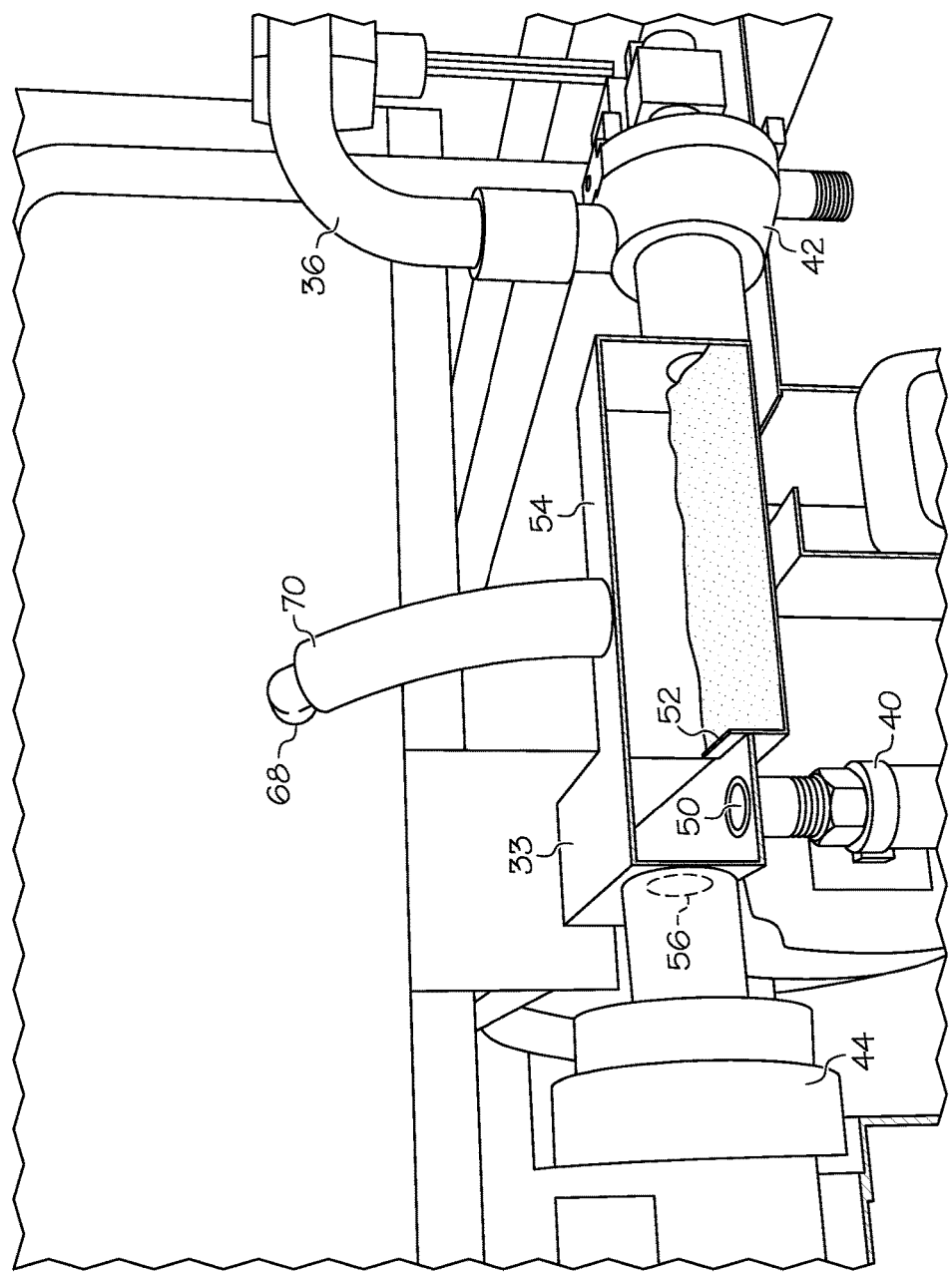
Figure 5:
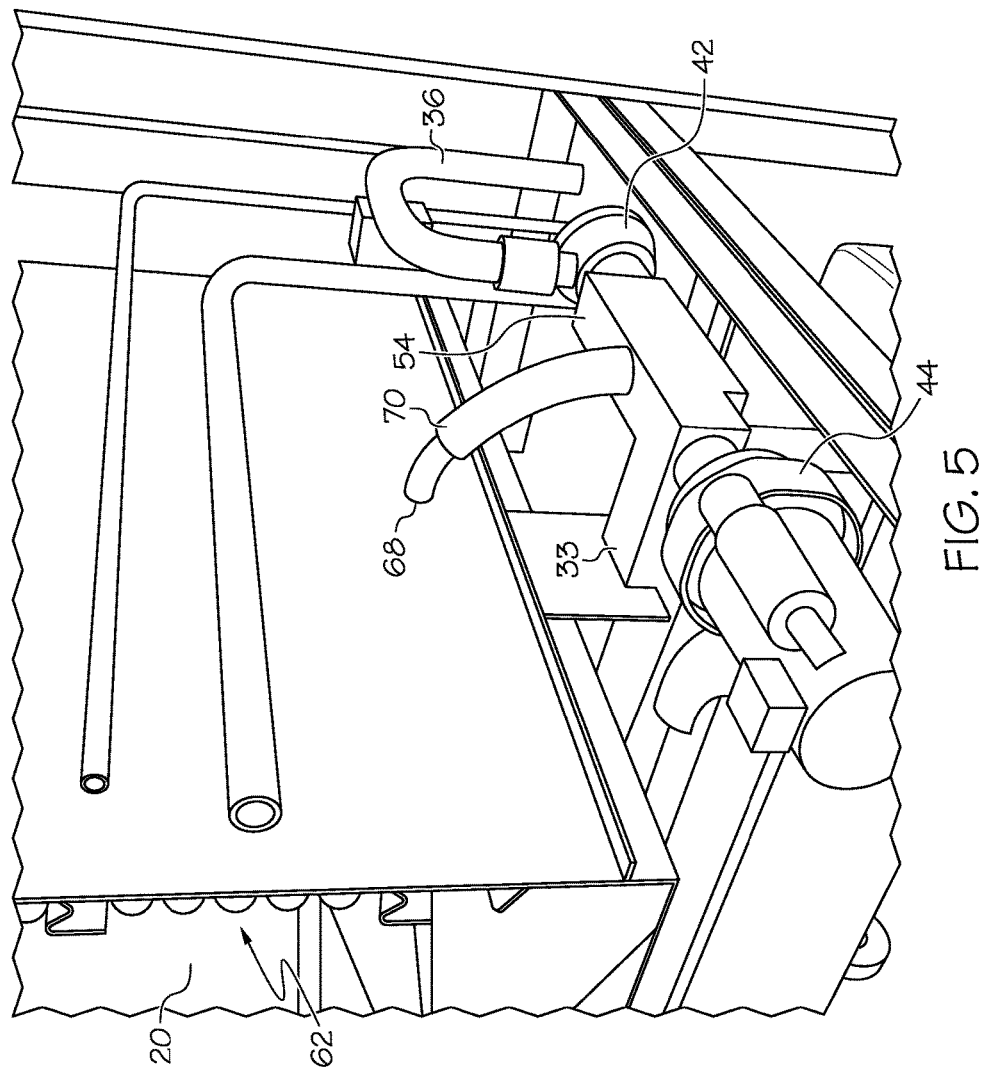
Figure 6:
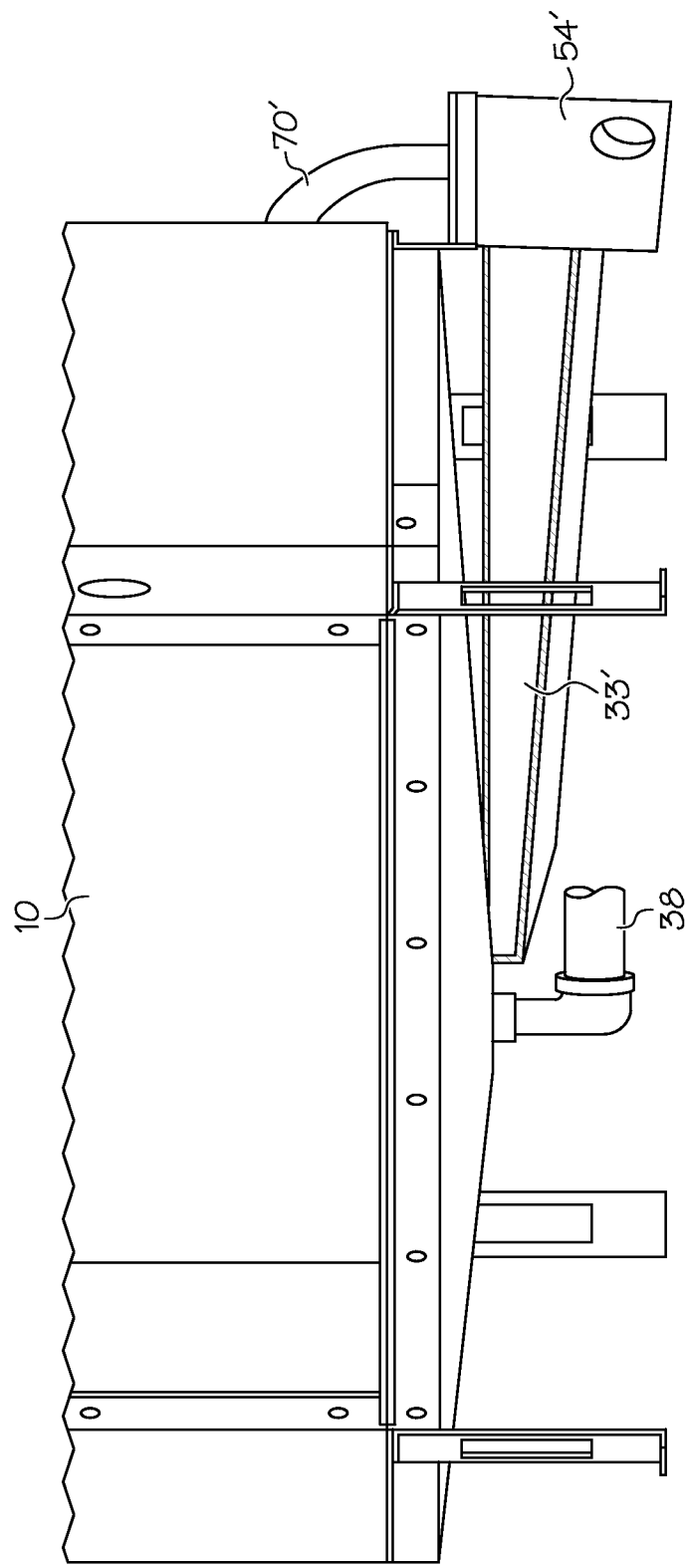
FIGS. 6-10 illustrate another embodiment of an excess steam water collection arrangement.
Figure 7:
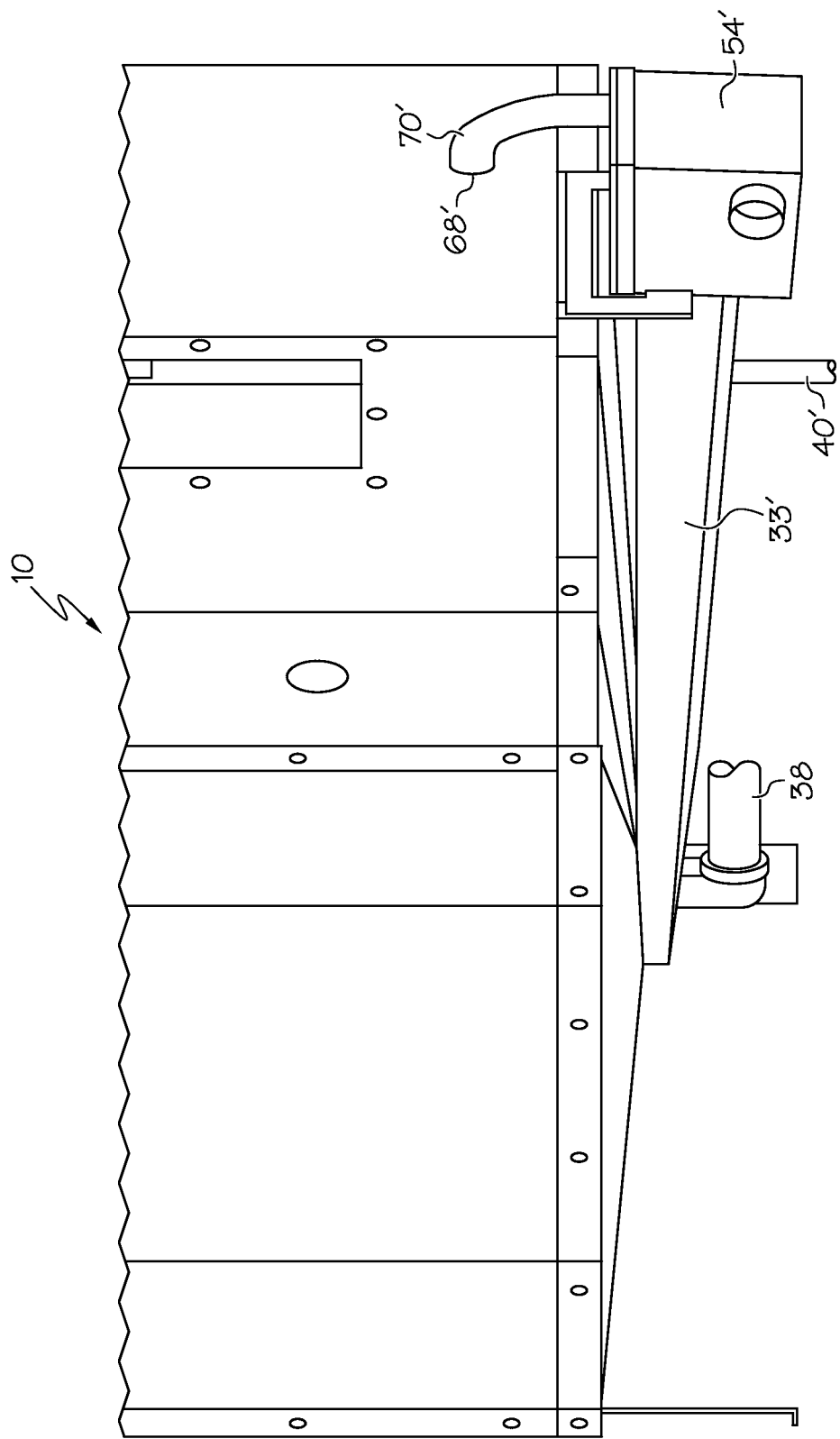

Referring now to FIGS. 4 and 5, the valve 40 and pumps 42, 44 are shown in a perspective view, all located toward the end of the chamber drain flow path 33. As seen in FIG. 4, a food drippings drain opening 50 is located in the floor of the chamber drain flow path 33 so that food drippings exit the chamber drain flow path 33 (i.e., when the valve 40 associated with opening 50 is in an open state under control by the controller 100) before reaching a downstream water collecting chamber or compartment 54. The chamber opening 68 leads to water exit flow path 70 that delivers the water into the water collecting compartment 54. Notably, the compartment 54 is separated from the lower end of the chamber drain flow path 33 by a raised baffle wall 52, which prevents the excess water from moving back into the chamber drain flow path 33 and mixing with any grease or other food drippings that may be draining during the cooking and steaming operations of a cooking cycle.

The water collecting compartment 54 includes a drain outlet path that includes pump 42 (or alternatively a valve) and drain water drain path 36. Pump or valve 42 may be operated (e.g., under control of controller 100) to remove or purge the excess water to drain path 36 (e.g., periodic or occasional operation of the pump or valve 42 under control of an algorithm that monitors water input to the steam unit and expected conversion efficiency of that water to steam given the thermal mass and temperature conditions), while the valve 40 is open to allow any grease or other food drippings to be delivered to a grease container or compartment. The periodic or occasional operation of the pump or valve 42 may be stopped after the steaming operation of a cooking cycle. An opening 56 at the end of the chamber drain flow path 33 that leads to the wash pump 44 is also shown in FIG. 4.

Some ovens generate steam by delivering water into a circulation fan of the oven, causing excess water that is not converted to steam to mix with food dripping flows out of the oven. This mixture of food drippings (particularly grease) and water results in a need to follow special installation codes and possibly use of a grease trap to separate the water and grease outside of the cooking chamber 20. Advantageously, the above-described arrangement avoids mixing of the excess water from the steaming operation with the exiting grease flows, enabling simpler installation and possible elimination of any need for a grease trap.

An alternative embodiment of the system that receives the excess water flows through the heat accumulator arrangement is shown in FIGS. 6-10, where a water collecting compartment 54' is located at the end of a chamber drain flow path 33'. Water exit path 70 leads to the compartment 54' as in the above described embodiment. However, in this embodiment the baffle wall 52' is located downstream of the food drippings opening 50' and upstream of the compartment 54', and the compartment includes both a drain outlet path or flow 36' that includes both drain pump or valve 42' and water drain path 36 for pumping or purging water to drain, and a recirculation outlet path or flow 38' that includes recirculation pump 44' and water recirculation path 38 for pumping water to the spray system within the cooking chamber 20. The paths to drain pump 42' and recirculating pump 44' are located on opposite ends of the chamber 54'. During cooking, per FIG. 8, the grease drain valve 40' is open and the baffle wall 52' prevents grease or other food dripping from traveling to the compartment 54'. During cleaning operations, the grease drain valve 40' is closed and recirculated water fills the chamber drain flow path 33' per FIG. 9 and enters the compartment 54' where it is delivered to the pump 44' for recirculation.

Figure 8:
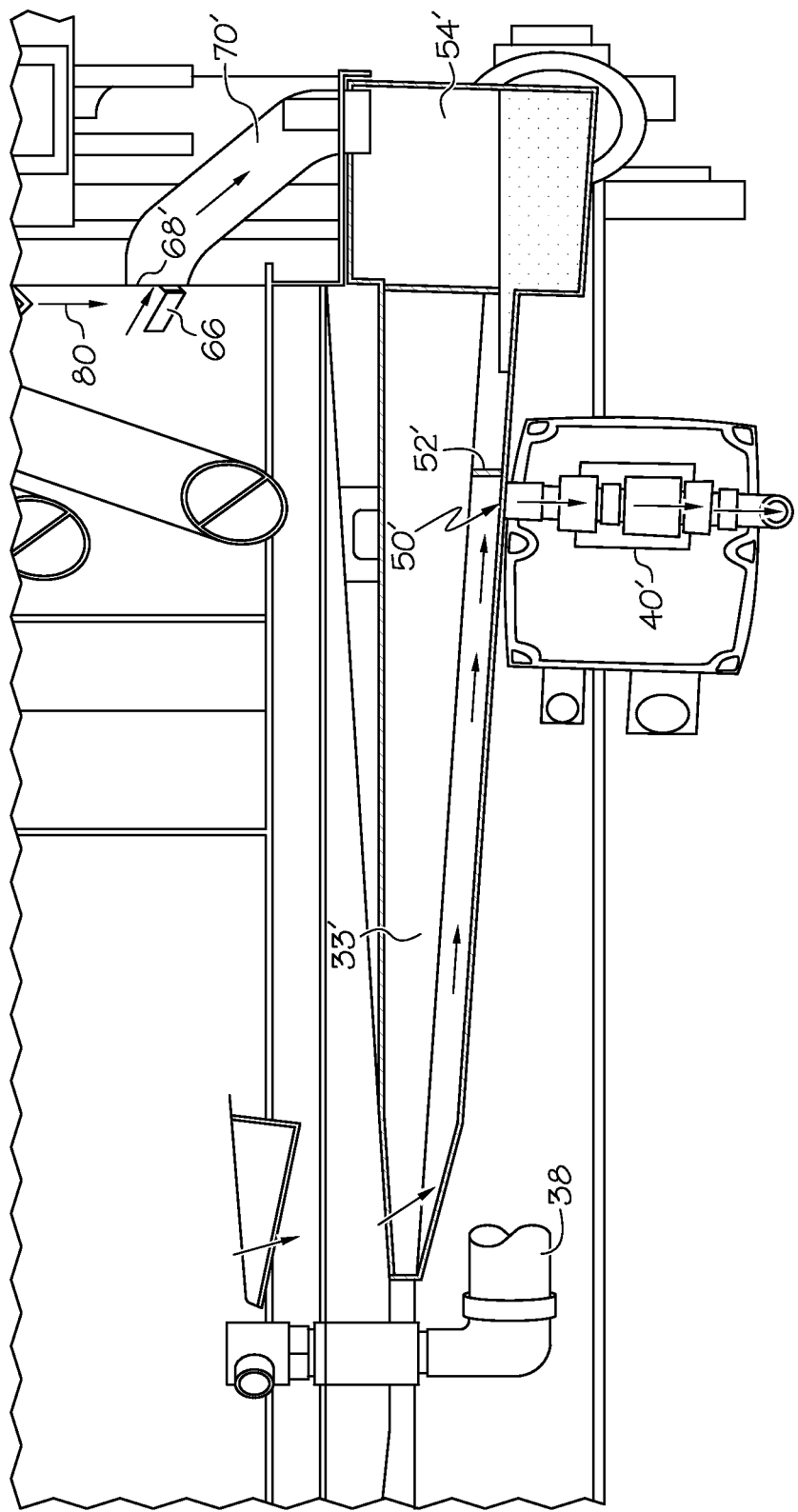
Figure 9:
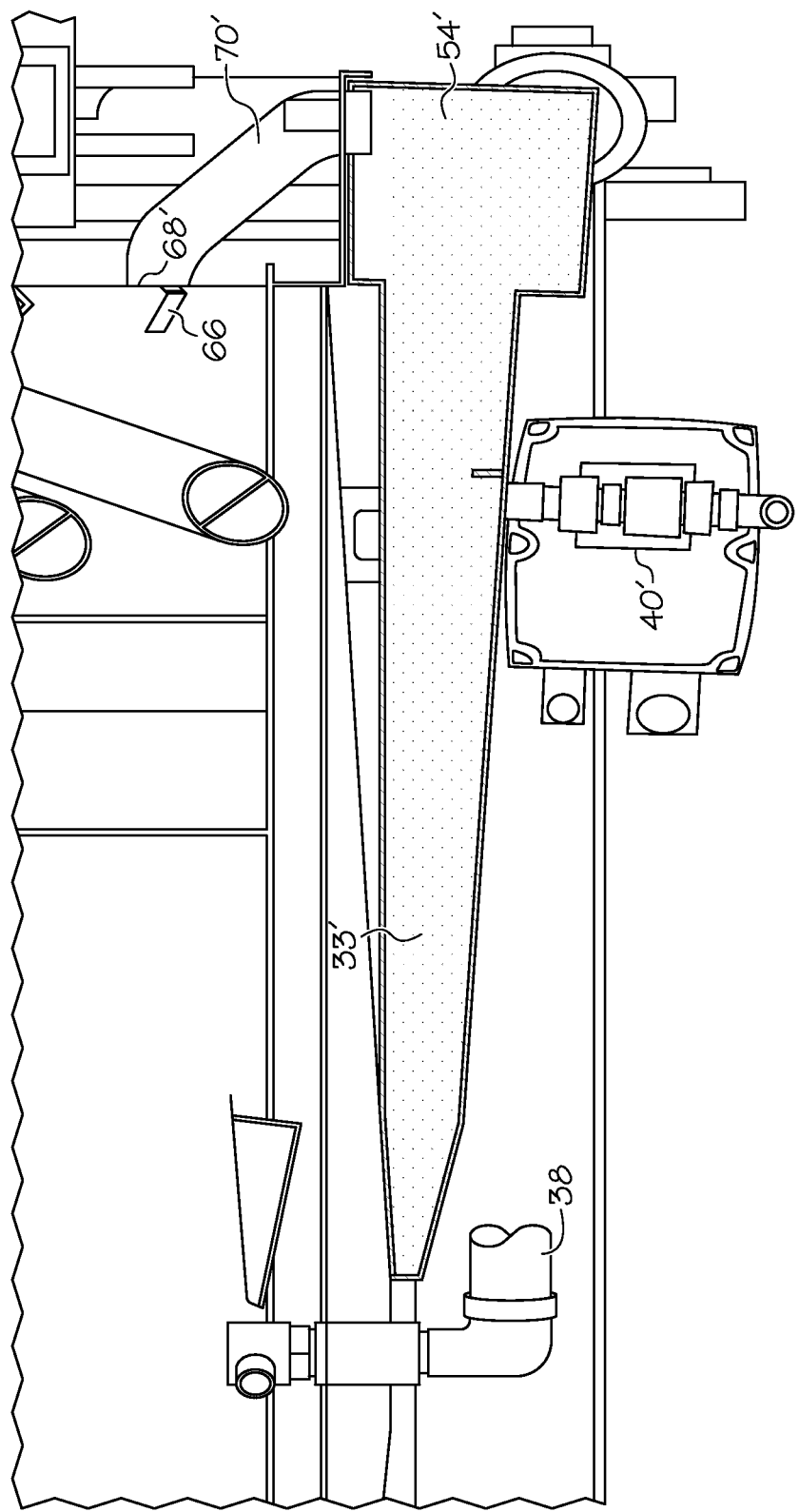
Figure 10:
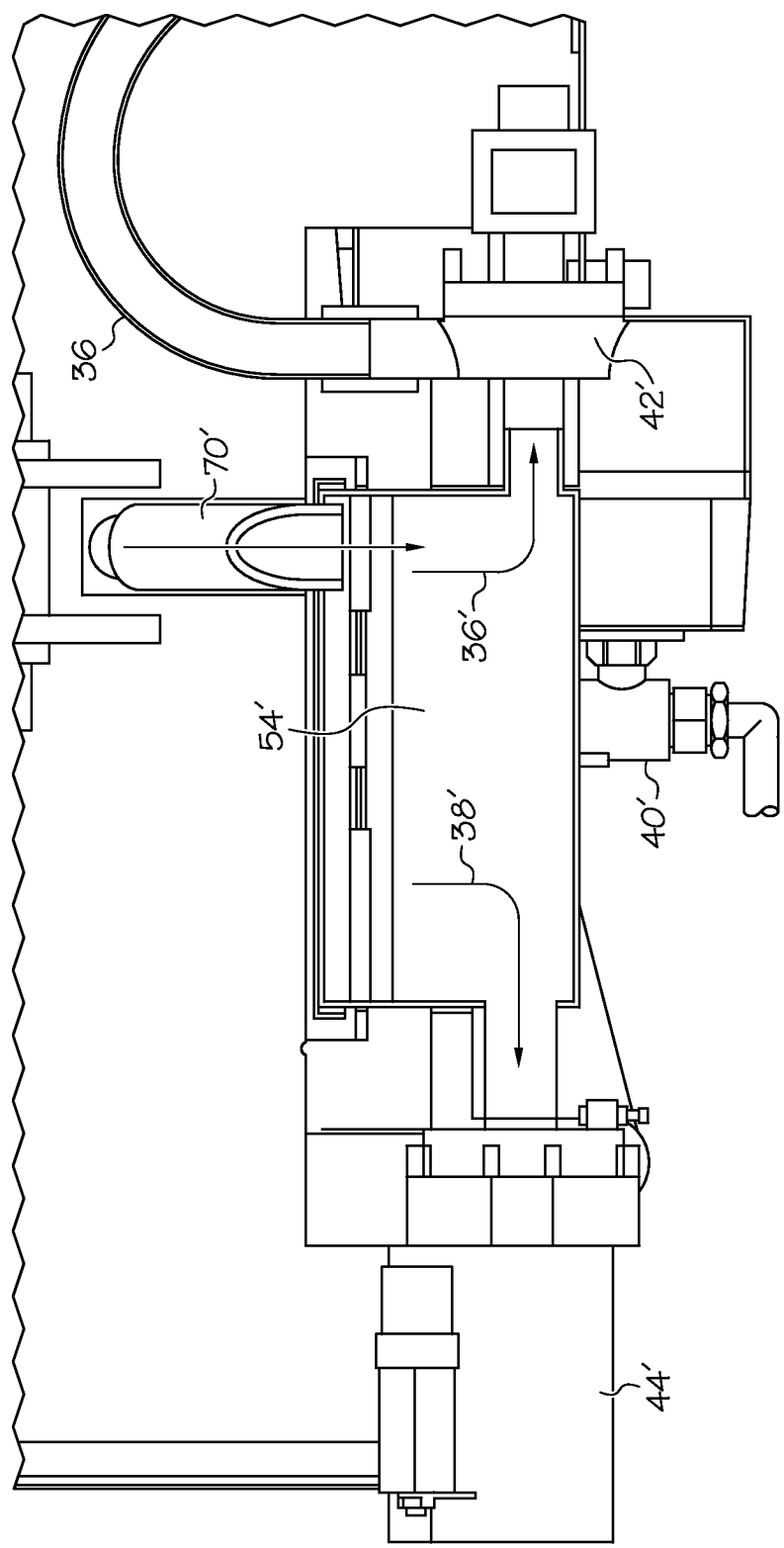

As noted above, during the steaming portion of a cooking cycle, any captured excess water is delivered from trough 66', through chamber opening 68' and along path 70' into the compartment 54' per flow arrows 80 in FIG. 8. Because the compartment 54' includes both recirculation flow path 38' and drain flow path 36', the captured water can be dealt with in multiple ways.

In one example, similar to the above embodiment, the captured excess water from steaming operations can be delivered to municipal drain via pump or valve 42' and path 36. In such example, periodic or occasional operation of the pump 42 under control of an algorithm that monitors water input to the steam unit and expected conversion efficiency of that water to steam given the thermal mass and temperature conditions.

In another example, the captured excess water can be retained in the compartment 54' until the cooking cycle is complete and re-used for a cleaning operation of the oven chamber by running the recirculation pump 44', with additional fresh water added as needed. In such example, the additional fresh water may be added via a separate input line to the compartment 54' or by simply feeding water to the steam input arrangement and allowing all or a substantial majority of it to pass to the compartment 54' without being converted to steam in the cooking chamber 20.

In yet another example, some of the captured excess water may be purged to drain and some may be saved for re-use in a cleaning operation. In one implementation of such an example, where multiple cooking cycles are run in between cleaning operations, the amount of water collected in the compartment 54' may rise to a level that requires some of the water to be purged to drain to avoid such water flowing up the chamber drain path 33' and over the dam 52'. One or more water level sensors could be included in the compartment 54' to facilitate such an operation.

Figure 11:
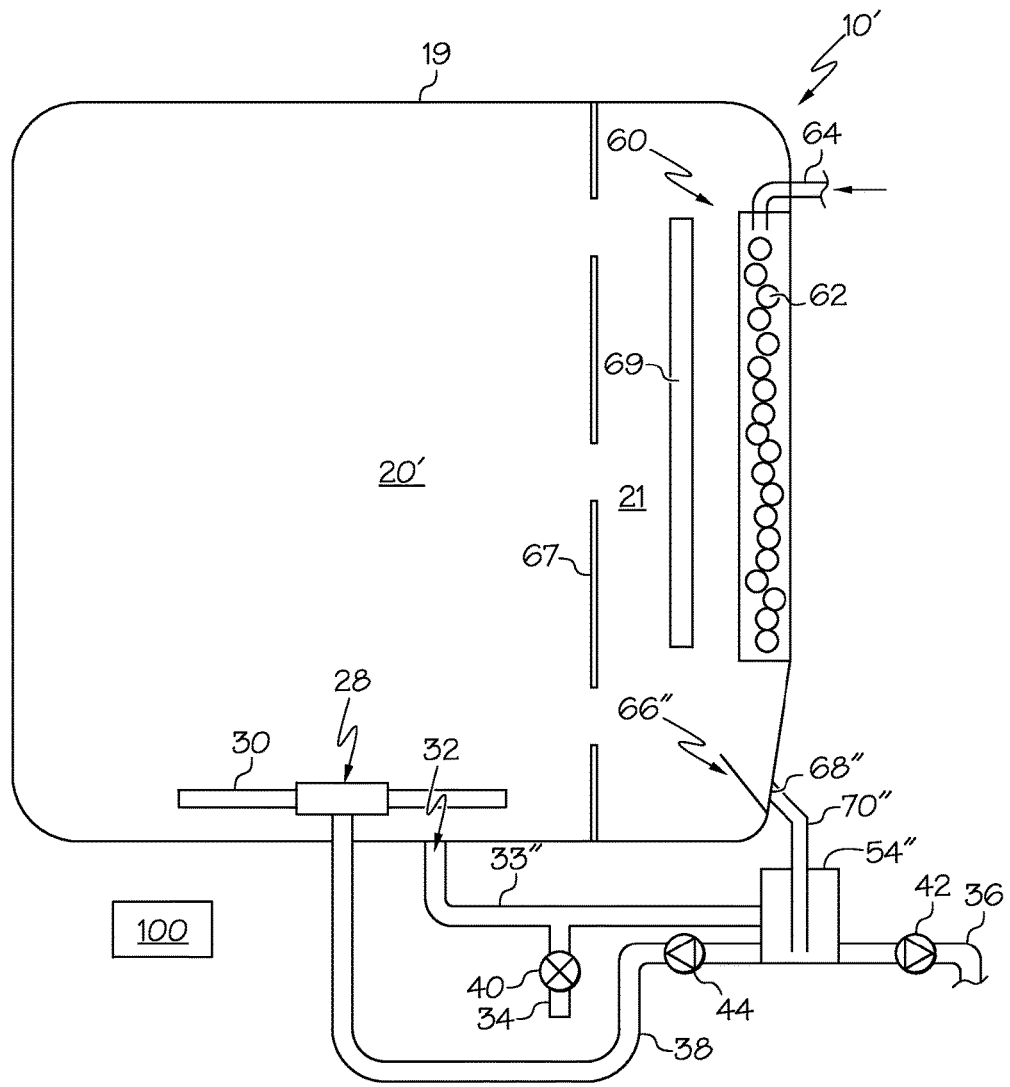
FIG. 11 is a schematic depiction of another oven embodiment.
Figure 12:
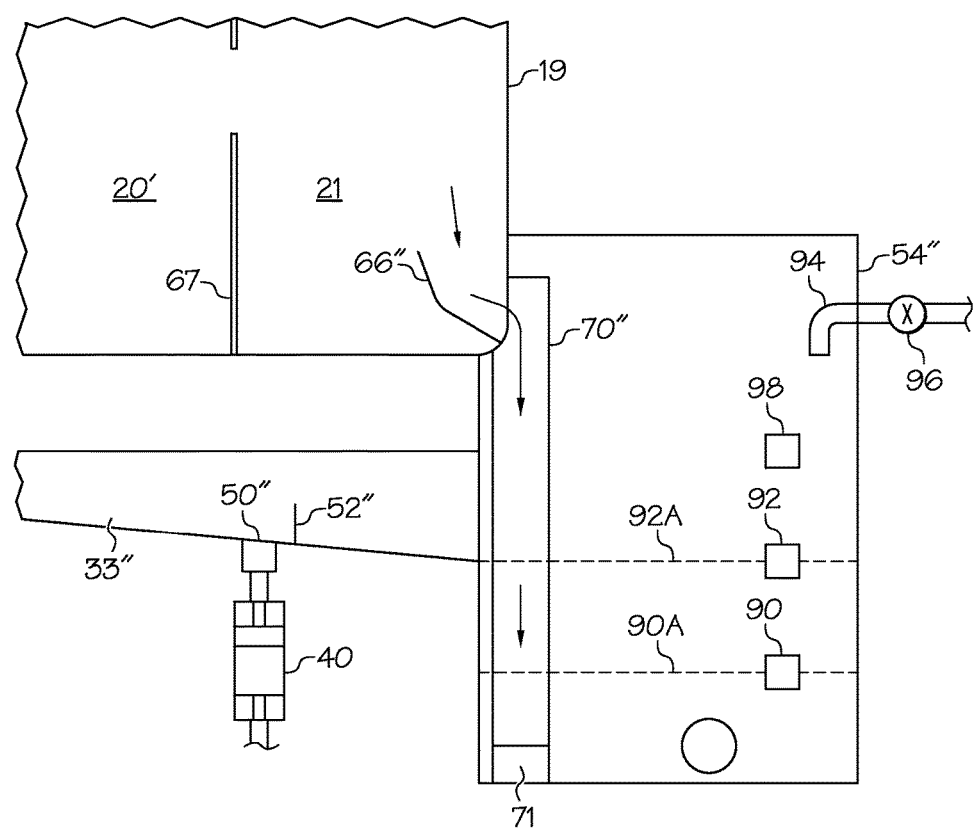
FIG. 12 is a partial. schematic side elevation of the steam water collection arrangement of the oven of FIG. 11.

Referring now to FIGS. 11 and 12, in another embodiment the oven 10' includes a chamber 19 that is divided by a panel or wall 67 into cooking section 20' and heat and steam section 21. The heat and steam section 21 includes a heating arrangement 69 (e.g., resistive heating elements or heat exchange tubes carrying hot combustion gases) and an air mover (not shown) recirculates heated air between section 21 to cooking section 20 through louvers or other openings or passages in the panel 67. The movement of this heated air also heats the heat accumulator arrangement 62 to prepare it for steam production when needed.

Water collecting trough 66" is located near the bottom wall of the chamber and moves excess water from the steam input arrangement 60 through an chamber side wall opening 68" and into a water exit path 70" (e.g., a tube). As best seen in FIG. 12, the water exit path 70" enters and extends down into the external water collecting compartment 54" so that the excess water leaves the path 70" via a path exit passage 71 located in a lower part of the compartment 54". Chamber drain flow path 33" also flows into compartment 54", with dam 52" and food drippings outlet 50" and associated valve 40 all located along the chamber drain flow path 33". The compartment 54" may include water level sensors 90 and 92 (e.g., float-type sensors or other type) that are used to set and control and maintain the water level in the compartment.

In one particular embodiment, during oven cooking operations the water level is maintained at a minimum level 90A determined by sensor 90. Maintaining this minimum water level 90A assures that the flow path (via opening 68" and path 70") between the oven chamber 19 and the compartment 54" is partially submerged so that hot air is not free to flow along the path. In one implementation, the condition of the food drippings/grease drain valve 40 may set the oven status. In particular, when the valve 40 is open, the oven condition is considered a cooking condition and the minimum water level 90A will be maintained. If the valve 40 is open and the water level in compartment 54" is below level 90A, then water is added to the compartment 54" by a water input 94 (e.g., by opening associated valve 96) until the water level 90A is reached. The separate input 94 is used rather than delivery through the steam input arrangement in order to avoid interfering with the cooking operation by producing steam or humidity at an undesired point in the cooking cycle.

As the cooking operation progresses, steaming operations occur which result in additional water coming into the compartment 54" via the path 70". If the water level rises to level 92A as indicated by sensor 92, then the water drain pump or valve 42 is operated to purge water to drain until the water level falls back down to level 90A. Thus, the water level may cycle between the two levels 90A and 92A during cooking operations. The upper level 92A is set to prevent the water from flowing up into the chamber drain flow path 33" and over the dam 52".

When oven cooking operation(s) are completed and a cleaning operation for the chamber is run, the valve 40 is closed. Some of the captured excess water from steaming typically remains in the compartment 54" and can be used for cleaning, but additional water is also delivered into the compartment 54" for the purpose of the oven cleaning operation (e.g., such water could be added via input 94 or could be added by delivery through the steam input arrangement 60). The amount of water delivered for the purpose of the cleaning operation could be set according to a timed fill or could also be set according to an additional water level sensor 98. Once the desired water level for the washing operation is achieved, the recirculation pump 44 is operated for a defined time period for cleaning via the spray system 28, the pump 44 is stopped and then the drain pump or valve 42 is operated to purge all of the cleaning water along with the soils it contains. The compartment 54" can then be filled again for another spray cleaning operation. A given cleaning operation may include multiple fill, spray and purge cycles as desired. When the cleaning operation ends (after a final purge), the pump or valve 42 is shut off or closed and the grease drain valve 40 is again opened in preparation for the next cooking operation.

The above systems provide advantageous methods of oven operation. By way of example, a method is provided for operating an oven that includes a chamber with a food drippings outlet and a steam input arrangement that includes an associated heat accumulator arrangement. The method involves, during a cooking cycle: directing food drippings to the food drippings outlet for removal from the chamber; delivering water onto the heat accumulator arrangement to convert the water to steam; capturing excess water that passes through the heat accumulator arrangement without being converted to steam; and directing the excess water to a separate outlet from the chamber so that the excess water exits the chamber without mixing with food drippings that enter the food drippings outlet.

Where the drippings outlet leads to a first flow path from the chamber to a water collecting compartment, the separate outlet leads to a second flow path from the chamber to the water collecting compartment, and a drippings drain opening is located along the first flow path and upstream of the water collecting compartment, the method may include opening a drain valve associated with the drippings drain opening to enable food drippings to exit the first flow path before reaching the water collecting compartment.

Where the separate outlet leads to a flow path from the chamber to a water collecting compartment external of the chamber, and the water collecting compartment includes a drain outlet path that includes one of a pump for pumping water to drain or a valve for enabling water flow to drain, the method may include operating the pump or the valve during at least part of a steam input operation of the cooking cycle to remove some water from the water collecting compartment.

Where the separate outlet leads to a flow path from the chamber to a water collecting compartment external of the chamber, and the water collecting compartment includes a recirculation outlet path that includes a pump for pumping water to a spray system within the chamber, the method may include, after completion of the cooking cycle, operating the pump to carry out a cleaning operation of the chamber using at least some water collected from the steam input arrangement.

Where the separate outlet leads to a flow path from the chamber to a water collecting compartment external of the chamber, and the water collecting compartment includes a drain outlet path that includes one of a first pump for pumping water to drain or a valve for enabling water flow to drain and a recirculation outlet path that includes a second pump for pumping water to a spray system within the chamber, the method may include operating the first pump or valve to purge at least some collected water to drain and operating the second pump to reuse at least some collected water for a chamber cleaning operation.

It is to be clearly understood that the above description is intended by way of illustration and example only, is not intended to be taken by way of limitation, and that other changes and modifications are possible.

What is claimed is:

1. An oven, comprising:
   an oven chamber;
   an outlet from the oven chamber leading to a chamber drain flow path for delivering food drippings out of the oven chamber;
   a steam input arrangement associated with the oven chamber including a heat accumulator arrangement to which water is delivered to generate steam;
   a water collecting compartment external of the oven chamber;
   a water collecting structure positioned to capture excess water that passes through the heat accumulator arrangement without being converted to steam before the excess water mixes with food drippings in the oven chamber and to deliver the excess water to a water exit path from the oven chamber without the excess water mixing with food drippings traveling along the chamber drain flow path, wherein the water exit path delivers excess water to the water collecting compartment;
   wherein the chamber drain flow path leads to the water collecting compartment, wherein a drippings drain opening is located along the chamber drain flow path and upstream of the water collecting compartment to enable food drippings to exit the chamber drain flow path before reaching the water collecting compartment, and the chamber drain flow path is separate from the water exit path.

2. The oven of claim 1 wherein the heat accumulator arrangement has an upright orientation and the water collecting structure is formed by at least one trough located below the heat accumulator arrangement and that directs the excess water to a chamber side wall opening that leads to the water exit path.

3. The oven of claim 2 wherein the heat accumulator arrangement is positioned alongside a side wall of the oven chamber, and the trough and the chamber side wall opening are both raised above a floor of the oven chamber, the floor of the oven chamber includes the outlet that leads to the chamber drain flow path.

4. The oven of claim 1 wherein the water collecting compartment includes a drain outlet path that includes at least one of a first pump for pumping water to drain or a water drain valve for enabling water flow to drain.

5. The oven of claim 4 wherein the water collecting compartment includes a recirculation outlet path that includes a second pump for pumping water to a spray system within the oven chamber.

6. The oven of claim 5 wherein a controller is configured for selectively operating one of the first pump to purge the excess water to drain or the second pump to reuse the excess water for a chamber cleaning operation.

7. The oven of claim 4 wherein a controller is configured to operate the first pump or open the water drain valve during at least part of a steam input operation of an oven cooking cycle.

8. An oven, comprising:
   an oven chamber;
   a chamber floor outlet leading to a chamber drain flow path for delivering food drippings out of the oven chamber;
   a steam input arrangement within the oven chamber including a heat accumulator arrangement to which water is delivered to generate steam;
   a water collecting structure positioned to capture excess water that passes through the heat accumulator arrangement without being converted to steam and to deliver the excess water to a water exit path from the oven chamber without the excess water mixing with food drippings traveling along the chamber drain flow path, wherein the water exit path delivers water to a water collecting compartment external of the oven chamber, wherein the water collecting compartment includes both a drain outlet path that includes at least one of a first pump for pumping water to drain or a water drain valve for enabling water flow to drain, and a recirculation outlet path that includes a second pump for pumping water to a spray system within the oven chamber.

9. The oven of claim 8 wherein the chamber drain flow path leads to the water collecting compartment, a drippings drain opening is located along the chamber drain flow path and upstream of the water collecting compartment to enable food drippings to exit the chamber drain flow path before reaching the water collecting compartment.

10. The oven of claim 8 wherein a controller is configured for operating one of the first pump or the water drain valve to purge the excess water to drain or the second pump to reuse the excess water for a chamber cleaning operation.

11. The oven of claim 8 wherein the water collecting compartment includes a minimum water level that is maintained during oven cooking operations and the water exit path delivers water into the water collecting compartment at a point below the minimum water level such that water in the water collecting compartment prevents free flow of air between the water collecting compartment and the oven chamber along the water exit path.

12. The oven of claim 9 wherein the water collecting compartment includes a maximum water level indicator for oven cooking operations to prevent water in the water collecting compartment from rising to a level that would cause mixing with food drippings traveling along the chamber drain flow path.

13. An oven, comprising:
   an oven chamber including a first outlet through which food drippings can exit the oven chamber to a chamber drain flow path and a second outlet spaced apart from the first outlet, wherein the second outlet leads to a water exit path;

a steam input arrangement associated with the oven chamber and including a heat accumulator arrangement to which water is delivered to generate steam;

a water collecting compartment external of the oven chamber;

a water collecting structure positioned to capture excess water that passes through the heat accumulator arrangement before the excess water mixes with food drippings in the oven chamber, wherein the water collecting structure is positioned to deliver the excess water to the second outlet such that the excess water flows along the water exit path;

wherein the water exit path connects with the water collecting compartment a first location;

wherein the chamber drain flow path connects with the water collecting compartment at a second location;

wherein the first outlet is in a floor of the oven chamber and the second outlet is in a side wall of the oven chamber.

14. The oven of claim 13, wherein the water collecting structure is formed by at least one trough located below the heat accumulator arrangement and that directs the excess water to the second outlet.

15. An oven, comprising:

an oven chamber including a first outlet through which food drippings can exit the oven chamber to a chamber drain flow path and a second outlet spaced apart from the first outlet, wherein the second outlet leads to a water exit path;

a steam input arrangement associated with the oven chamber and including a heat accumulator arrangement to which water is delivered to generate steam;

a water collecting compartment external of the oven chamber;

a water collecting structure positioned to capture excess water that passes through the heat accumulator arrangement before the excess water mixes with food drippings in the oven chamber, wherein the water collecting structure is positioned to deliver the excess water to the second outlet such that the excess water flows along the water exit path;

wherein the water exit path connects with the water collecting compartment a first location;

wherein the chamber drain flow path connects with the water collecting compartment at a second location;

wherein the water collecting compartment includes both a drain outlet path that includes at least one of a first pump for pumping water to drain or a water drain valve for enabling water flow to drain, and a recirculation outlet path that includes a second pump for pumping water to a spray system within the oven chamber.

16. An oven, comprising:

an oven chamber including a first outlet through which food drippings can exit the oven chamber to a chamber drain flow path and a second outlet spaced apart from the first outlet, wherein the second outlet leads to a water exit path;

a steam input arrangement associated with the oven chamber and including a heat accumulator arrangement to which water is delivered to generate steam;

a water collecting compartment external of the oven chamber;

a water collecting structure positioned to capture excess water that passes through the heat accumulator arrangement before the excess water mixes with food drippings in the oven chamber, wherein the water collecting structure is positioned to deliver the excess water to the second outlet such that the excess water flows along the water exit path;

wherein the water exit path connects with the water collecting compartment a first location;

wherein the chamber drain flow path connects with the water collecting compartment at a second location;

wherein a drippings drain opening is located along the chamber drain flow path and upstream of the water collecting compartment to enable food drippings to exit the chamber drain flow path before reaching the water collecting compartment, and a raised baffle wall is located along the chamber drain flow path between the drippings drain opening and the water collecting compartment.

* * * * *

UNITED STATES PATENT AND TRADEMARK OFFICE
CERTIFICATE OF CORRECTION

PATENT NO. : 10,408,463 B2  
APPLICATION NO. : 15/305256  
DATED : September 10, 2019  
INVENTOR(S) : Jason M. Stephens Page 1 of 1

It is certified that error appears in the above-identified patent and that said Letters Patent is hereby corrected as shown below:

On the Title Page

Item (60) The "Related U.S. Application Data" section currently reads:
"Provisional application No. 62/028,631, filed on Jul. 24, 2015, provisional application No. 61/982,698, filed on Apr. 22, 2014."

But should read:
--Provisional application No. 62/028,631, filed on Jul. 24, 2014, provisional application No. 61/982,698, filed on Apr. 22, 2014.--

Signed and Sealed this  
Twenty-second Day of October, 2019

Andrei Iancu  
*Director of the United States Patent and Trademark Office*